(12) United States Patent
Kang et al.

(10) Patent No.: US 7,399,093 B2
(45) Date of Patent: Jul. 15, 2008

(54) REFLECTION MIRROR OF PROJECTION TELEVISION AND FABRICATION METHOD THEREOF

(75) Inventors: Taeg Ho Kang, Gyeongsangbook-do (KR); Deog Jin Lee, Goomi-si (KR); Dong Kweon Shin, Daegu-si (KR); Ju Young Jeong, Daegu-si (KR); Jong Ho Lee, Goomi-si (KR); Yong Joo Lee, Daegu-si (KR)

(73) Assignee: LG Electronics Inc., Seoul (KR)

(*) Notice: Subject to any disclaimer, the term of this patent is extended or adjusted under 35 U.S.C. 154(b) by 641 days.

(21) Appl. No.: 10/664,813

(22) Filed: Sep. 17, 2003

(65) Prior Publication Data
US 2004/0119895 A1  Jun. 24, 2004

(30) Foreign Application Priority Data
Sep. 19, 2002  (KR) ............ 10-2002-0057452
Sep. 4, 2003  (KR) ............ 10-2003-0061850
Sep. 4, 2003  (KR) ............ 10-2003-0061851

(51) Int. Cl.
*G02B 5/08* (2006.01)
*G02B 7/182* (2006.01)

(52) U.S. Cl. ............ 359/846; 359/847; 359/871; 353/75; 353/97; 353/98

(58) Field of Classification Search ............ 359/846, 359/847, 848, 871, 883; 348/782, 832; 353/75, 353/97, 98
See application file for complete search history.

(56) References Cited

U.S. PATENT DOCUMENTS 5,506,642 A * 4/1996 Suzuki et al. ............ 353/74
6,065,843 A * 5/2000 Martinez, Sr. ............ 359/847
6,203,162 B1 * 3/2001 Yamashita et al. ............ 359/883
6,425,672 B2 * 7/2002 Yamashita et al. ............ 359/883
6,986,586 B2 * 1/2006 Martinez, Sr. ............ 359/847

FOREIGN PATENT DOCUMENTS

JP  09-061608  * 3/1997

* cited by examiner

*Primary Examiner*—Ricky D Shafer
(74) *Attorney, Agent, or Firm*—Ked & Associates, LLP

(57) ABSTRACT

Disclosed is a reflection mirror of a projection television to prevent the frame of the projection television from being deformed and to fabricate the projection television with ease. The reflection mirror is fabricated by forming a plurality of ribs at a section of the frame and inserting a soft shield plate between the ribs.

16 Claims, 5 Drawing Sheets

REFLECTION MIRROR OF PROJECTION TELEVISION AND FABRICATION METHOD THEREOF

BACKGROUND OF THE INVENTION

1. Field of the Invention

The present invention relates to a reflection mirror of a projection television and a fabrication method thereof, and more particularly, to a reflection mirror of a projection television and a fabrication method thereof in which a frame for supporting a reflection film placed on an optical path of the projection television is improved to realize a more definitive picture quality.

2. Description of the Related Art

A projection television is provided, between a projection light source and a screen, with a reflection mirror so as to reduce the overall volume. Images projected from the projection light source are reflected by the reflection mirror and displayed on the screen in a size that is greater than the original image size.

In particular, the reflection mirrors can be classified into a glass type reflection mirror formed of glass and a film type reflection mirror formed from a film obtained by fixing a soft reflection film with a predetermined flatness to the frame.

Although the glass type reflection mirror shows outstanding flatness and endurance characteristics, it is not used any more due to its disadvantages such as heavy weight, danger of fracture and high costs. Recently, the film type reflection mirror is being widely used.

FIG. 1 is a sectional view of a conventional projection television.

Referring to FIG. 1, a projection television 1 includes a projector serving as a light source for projecting a projection light, a reflection mirror 20 for reflecting the projected light, and a screen 45 on which the projected light is incident to form a picture.

FIG. 2 is a perspective view of a conventional reflection mirror.

Referring to FIG. 2, a conventional reflection mirror 20 includes a trapeziform frame 22 in which the upper side is shorter than the lower side, and a reflection film 21 formed on the frame in a state that a tight tension is maintained on the upper surface of the frame.

The reflection film 21 generally includes a thin metal film with an outstanding reflection performance, and a resin layer having a superior transparency performance and for maintaining the flatness of the thin metal film and completely reflecting an incident light.

The frame 22 is shaped to have a strength enough to maintain the tension of the reflection film and to satisfy a minimum weight condition.

In the meanwhile, considering the characteristic of the reflection surface of the reflection mirror 20, it is most important to maintain the flatness of the reflection film 21. In case the flatness of the reflection mirror 20 is not perfect, the image displayed on the screen seems curved or distorted abnormally.

Then, the conventional reflection mirror 20 does not have an enough strength for the frame 22. Hence, in case the conventional reflection mirror 20 is continuously used, a dull curved face or a wrinkle is formed at the conventional reflection mirror 20, so that images formed on the screen are frequently distorted.

In particular, in case the temperature variation of a place where the projection television is positioned is serious, a wrinkle is generated at the reflection film 21 due to a difference in the thermal expansion coefficient between the frame 22 made of metallic aluminum (Al) and the reflection film 21 made of resin. For instance, when a surrounding temperature is low, a contraction amount of the reflection film 21 is larger than that of the frame 22, so that the tension of the reflection film 21 is not maintained at the same level as the tension of when it was fabricated.

FIGS. 3 and 4 illustrate occurrence of wrinkle in a conventional reflection mirror structure.

Referring to FIG. 3, if the tension for allowing the reflection film 21 to be maintained in a tight state is continuously applied to and exceeds the endurance limit of the frame 22, the frame 22 is deformed as shown in the drawing.

FIG. 4 is a sectional view taken along the line B-B' of FIG. 3, and shows that upper side edges of the frame 22 are inwardly pushed due to the tension of the reflection film 21 occurring at the upper side edges of the frame 22. In FIG. 4, the dotted lines show that the frame 22 is deformed.

As aforementioned, when a larger tension is applied to the reflection film 21 in order to prevent wrinkle from being generated due to the variation in temperature, the deformation of the frame is further accelerated while high and low temperatures are repeatedly applied, so that permanent wrinkles may be formed.

SUMMARY OF THE INVENTION

Accordingly, the present invention is directed to a reflection mirror of a projection television that substantially obviate one or more problems due to limitations and disadvantages of the related art.

It is an object of the present invention to provide a reflection mirror of a projection television in which a deformation of a frame is prevented to thereby improve qualities of pictures displayed on a screen.

It is another object of the present invention to provide a reflection mirror of a projection television in which a method for fixing the reflection film to a frame is improved to prevent wrinkle from being generated in the reflection film due to repeated heat.

It is a further another object of the present invention to provide a reflection mirror of a projection television in which a fabrication process is simplified to enhance the workability and save the fabrication costs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a reflection mirror of a projection television comprising: a reflection film to which a predetermined tension is applied; a rectangular structural body to which corner portions of the reflection film are fixed and having a rectangular section shape as a whole such that the tension of the reflection film is maintained; a curvature portion curvedly formed at an outer upper edge of the rectangular structural body; a sliding portion extending downward from the curvature portion and on which the reflection film slides freely; an adhesive portion formed extending from a lower side of the sliding portion to a lower edge of the rectangular structural body, for fixing the reflec-} tion film; at least three ribs extending inwardly from an inner side portion of the rectangular structural body; and a frame provided with a soft shield plate inserted between the ribs.

In an aspect of the present invention, there is provided a frame structure of a reflection mirror in a projection television, the frame structure being configured to form a section comprising: a rectangular structural body; two ribs extending inwardly from an upper edge and a lower edge of the rectangular structural body, for enhancing the strength of the frame; and a vertical bar connecting the two ribs at different positions.

In another aspect of the present invention, there is provided a reflection mirror of a projection television comprising: a reflection film; a rectangular structural body having a rectangular section shape as a whole; a curvature portion formed at an outer upper edge of the rectangular structural body; an adhesive portion formed at a predetermined portion of a lower side of the curvature portion and to which the reflection film is adhered; a reinforcing rib of which one end is fixed to the outer upper edge of the rectangular structural body and the other end is fixed to an inner surface of the rectangular structural body; a frame provided with a rib and a vertical bar formed in the rectangular structural body, for enhancing strength of the frame; and a soft shield plate formed at a lower surface of the frame.

In a further aspect of the present invention, there is provided a reflection mirror of a projection television comprising: a trapeziform frame formed in a rectangular structural body having an approximate rectangular section shape; at least three ribs extending inwardly from an inner surface of the rectangular structural body; a vertical bar connecting the ribs in a vertical direction; and a single soft shield plate inserted between the ribs.

In a further another aspect of the present invention, there is provided a method for fabricating a reflection mirror for a projection television, the method comprising the steps of: compressing a corner portion of a soft shield plate having a predetermined shape; and inserting the compressed soft shield plate in a frame.

According to the present invention, a deformation of the reflection mirror can be prevented, so that improvement in picture quality is obtained.

Also, since the fabrication process can be performed with convenience, a worker's convenience is enhanced and fabrication costs are reduced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
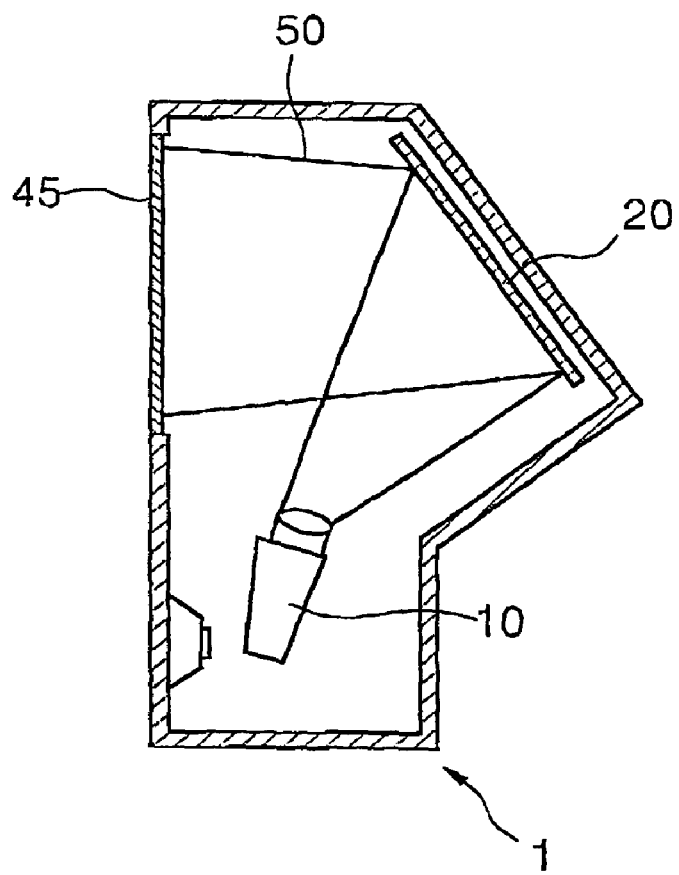
FIG. 1 is a sectional view of a conventional projection television.
Figure 2:
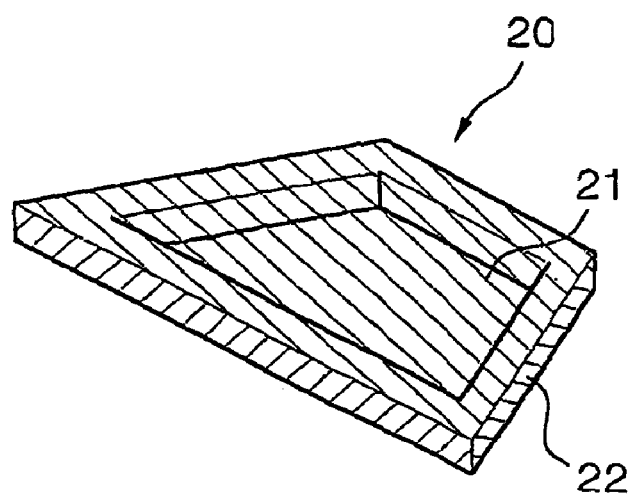
FIG. 2 is a perspective view of a conventional reflection mirror.
Figure 3:
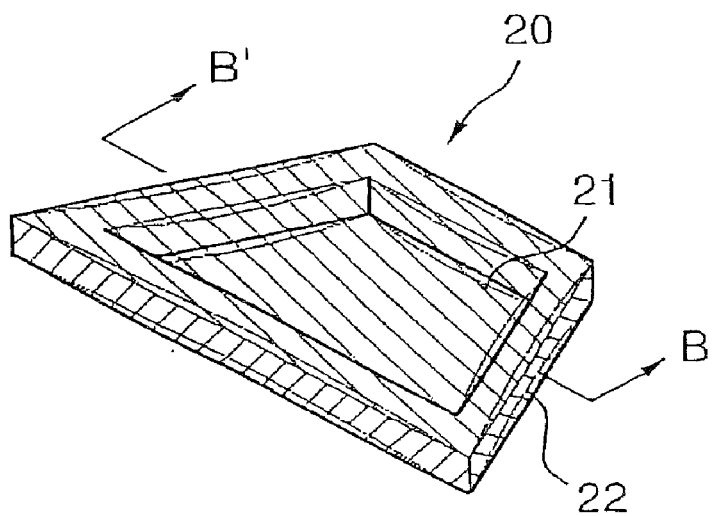
FIGS. 3 and 4 illustrate occurrence of wrinkle in a conventional reflection mirror structure.
Figure 4:
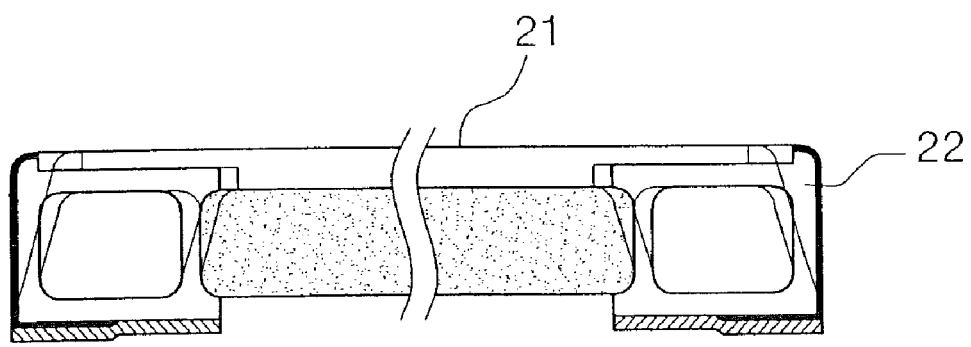
Figure 5:
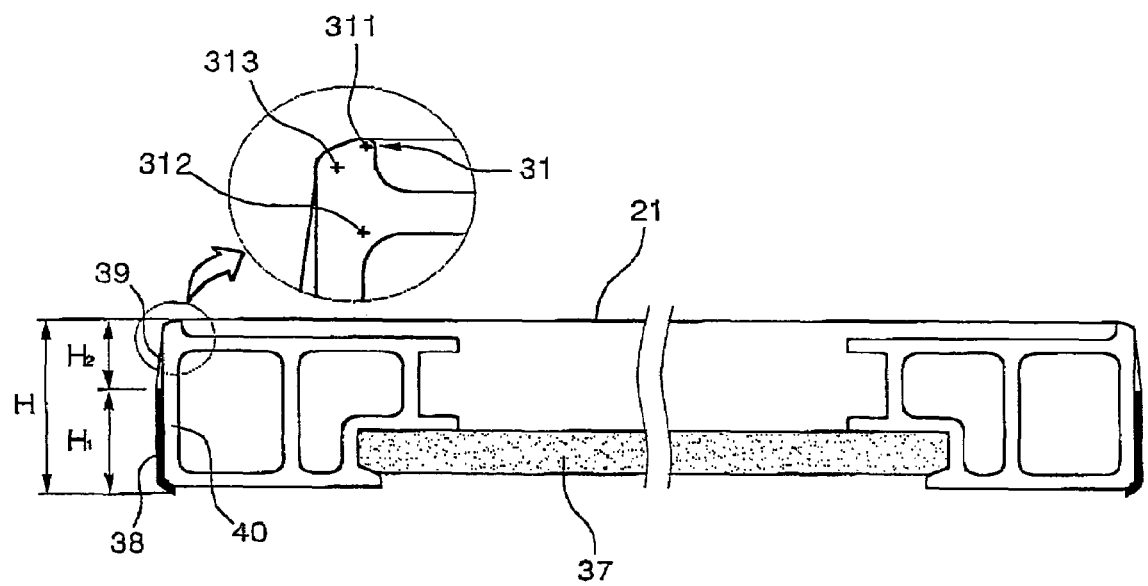
FIG. 5 is a sectional view illustrating a reflection mirror structure according to a first embodiment of the present invention.

FIG. 5 is a sectional view illustrating a reflection mirror structure according to a first embodiment of the present invention.

Referring to FIG. 5, a reflection mirror includes a reflection film 21 and a frame to which the reflection film 21 is adhered and fixed. In particular, a portion where the reflection film 21 and the frame 30 are adhered corresponds to a predetermined portion of an outer side surface of the frame 30.

In detail, a contact surface between the reflection film 21 and the frame 30 includes a sliding portion 39 formed extending from an upper side of an outer side surface of the frame 30 to a lower side by a predetermined height (H2), and an adhesive portion 38 positioned right below the sliding portion 39 and on which adhesive is coated from a contact surface between the reflection film 21 and the frame 30 by a predetermined height (H1).

Here, the adhesive portion 38 is above two thirds of the outer side surface of the frame 30 and below three fourths at maximum.

The sliding portion 39 is formed to allow the reflection film 21 to slide along the outer side surface of the frame 30 such that a variation in tension of the reflection film 21 is compensated when the reflection film 21 is loose or tight due to a difference in the thermal expansion coefficient between the reflection film 21 and the frame 30.

The adhesive portion 38 has a range or an area enough to prevent the reflection film 21 from being delaminated by a shear stress applied to the adhesive.

According to experiments, the adhesive portion 39 formed with an area above two thirds of the outer side surface of the frame 30 can sufficiently endure the shear stress applied to the adhesive due to the tension of the reflection film 21. However, when the tension, which should be applied to the reflection film depending on the screen size of the projection television, is large, the adhesive portion 39 can be extended to the lower side surface of the frame 30.

Also, at an upper edge of the sliding portion 39, a curvature portion 31 curved with a predetermined curvature is formed.

The curvature portion 31 includes a first curvature portion 311 curved inwardly with a predetermined curvature around the uppermost end of the frame 30, a second curvature portion 312 curved inwardly on the same extending line as the first curvature portion 311 and having a curvature larger than the first curvature portion 311, and a third curvature portion 313 extending toward an inner portion of the second curvature portion 312.

The curvature radius of the third curvature portion 313 is larger than that of the first curvature portion 311 but is smaller than that of the second curvature portion 312. In the meanwhile, on a contact surface between the curvature portion 31 and the reflection film 21, lubricant is coated to prevent the reflection film 21 from being damaged during the fabrication process. In other words, the lubricant allows the reflection film 21 to smoothly slide while the reflection film 21 is deformed by a thermal deformation so that defects that may occur at an inner surface of the reflection film 21 can be prevented.

Figure 6:
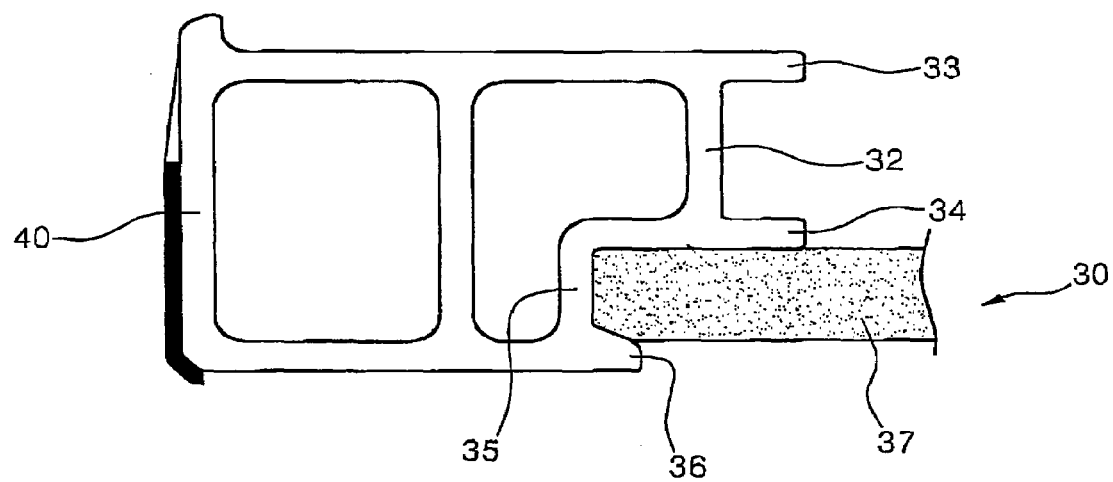
FIG. 6 is a sectional view of a frame in a reflection mirror according to the present invention.

FIG. 6 is a sectional view of a frame in a reflection mirror according to the present invention.

Referring to FIG. 6, the frame includes a rectangular structural body 40 having the curvature portion (see 31 of FIG. 5) formed at an outer upper edge of the frame 30 to prevent a defect from being generated in the reflection film 21 during the fabrication process of the reflection film 21, a first rib 33 extending inwardly from an upper edge of an inner side surface of the rectangular structural body 40, a third rib 36 extending inwardly from a lower edge of the inner side surface of the rectangular structural body 40, a second rib 34 formed approximately between the first rib 33 and the third rib 36, a first vertical bar 32 connecting the first rib 33 and the second rib 34, and a second vertical bar 35 connecting the second rib 34 and the third rib 36.

Also, the first rib 33 and the second rib 34 are formed with an identical length, and the third rib 36 is formed in a length that is smaller than the length of the second rib 34 such that the soft shield plate 37 is inserted between the second rib 34 and the third rib 36 through a rear side of the frame 30. In addition, an upper surface of the third rib 36 formed beveled such that the soft shield plate 37 is inserted conveniently.

The soft shield plate 37 is a porous material exampled as Styrofoam and prevents external vibration, impact and air flow from being directly applied to the reflection film 21. Also, since the soft shield plate 37 is inserted only between the second rib 34 and the third rib 36, its thickness can be thinned compared with a case when it is formed along the whole length of the frame in the up and down direction.

In other words, the soft shield plate 37 is formed in a thickness that is not an overall thickness but below half the overall thickness, and is then inserted in a lower side of the frame 30. Hence, the soft shield plate 37 can be deformed with ease, so that it can be more conveniently inserted in an opened portion formed in the rear surface of the frame 30.

Also, since the upper surface of the third rib 36 is formed beveled downwardly as it travels to the inside of the rectangular structural body and edges of the soft shield plate 37 are inserted into the upper surface of the third rib 36, the once inserted soft shield plate 37 does not sway, so that occurrence of noise is restrained and air flow is also restrained.

The first rib 33 and the second rib 34 are coupled by the first vertical bar 32 at a portion retreated by a predetermined length from their inner front ends in up and down directions such that the overall strength of the frame is enhanced. The second vertical bar 35 allows the second rib 34 to be coupled with the third rib 36 at a portion between the rear end of the second rib 34 and a position retreated by a predetermined length from the front end of the third rib 36 such that the strength of the frame is enhanced.

The ribs 33, 34 and 36 increase the inertia of the frame 30 thereby increasing the strength of the frame 30 itself corresponding to the tension applied by the reflection film 21. By doing so, the aforementioned frame deformation can be prevented. In particular, the vertical bars 32 and 35 formed between the respective ribs 33, 34 and 36 effectively cope with a vertical torsion of the frame 30 to reliably prevent the frame deformation.

Thus, since the strength of the frame is improved, the tension or the like of the reflection film 21 can be maintained at an original state as fabricated although the use time of the projection television is lengthened.

In the meanwhile, the inventive frame 30 can be formed by successively fabricating bars each having an approximate rectangular section shape from a mold as shown in the drawings, cutting the bars aslant, contacting the cut portions and fixing the contact portions by a proper process, for example, welding.

After that, an adhesive is coated on a lower side of an inner side surface of the trapeziform frame 30 formed as the aforementioned steps. After an elapse of about five minutes, which is a time necessary for the drying of the coated adhesive, the reflection film 21 is aligned with the side surface of the frame where the adhesive is coated in a state that the reflection film 21 is tightly pulled. Thereafter, the reflection film 21 is compressively adhered to the frame 30 by a soft member such as a wad of cotton to thereby form a whole reflection mirror.

In the above fabrication process, it is necessary that the portion where the adhesive is coated exceeds two thirds of the frame side surface from the lower side to the upper side and thereby the adhesive is pressed to allow the portion where the adhesive is expanded not to exceed three fourths of the overall height of the side surface of the frame 30 while the adhesive portion (see 38 of FIG. 6) is pressed by a wad of cotton.

Since the fabrication of the reflection mirror is performed by the aforementioned process, the adhesive coating process on the frame 30 is simplified and the pressing process using the wad of cotton is also simplified.

Figure 7:
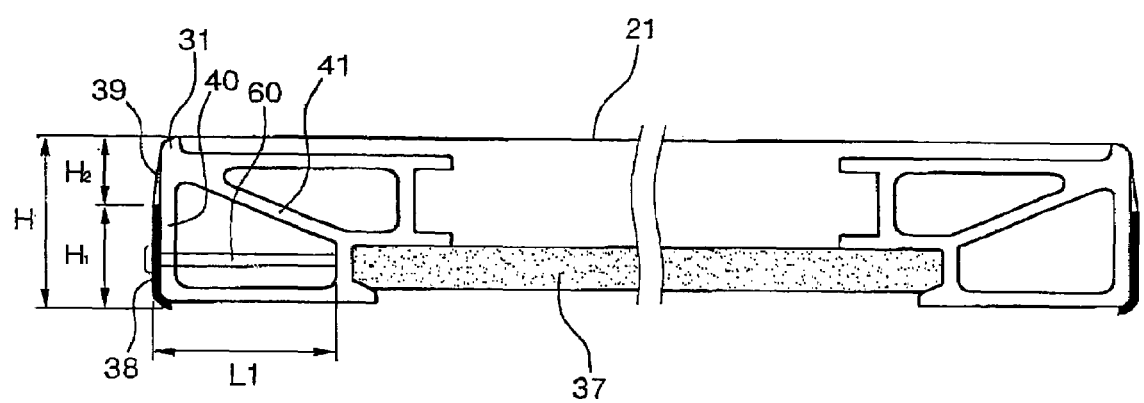
FIG. 7 is a sectional view illustrating a reflection mirror structure according to a second embodiment of the present invention.
Figure 8:
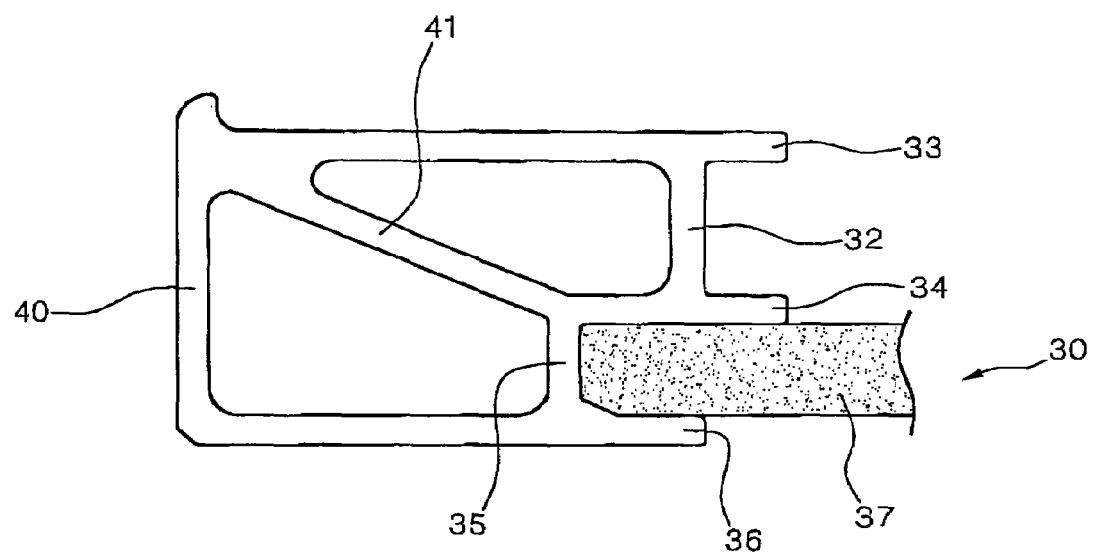
FIG. 8 is a sectional view of a reflection mirror frame according to a second embodiment of the present invention.

FIGS. 7 and 8 are views illustrating a second embodiment of the present invention.

While the second embodiment of the present invention is similar with the first embodiment in many elements, it has a difference in the shape of the rectangular structural body than the first embodiment. In other words, the rectangular structural body of the second embodiment is almost identical to that of the first embodiment but is modified in corners of the inner side surfaces of the rectangular structural body 40 and its surrounding shape.

Hereinafter, shape and position of a reinforcing rib 41 will be described in more detail.

In order to reinforce the strength of the rectangular structural body 40, a beveled reinforcing rib 41 is formed. The reinforcing rib 41 is arranged such that both ends thereof are respectively placed at an upper edge of the rectangular structural body 40 and a predetermined position of an inner corner of the rectangular structural body 40.

In more detail, one end of the reinforcing rib 41 is connected with an upper outer edge of the rectangular structural body 40 such that the force applied by the tension of the reflection film 21 is directly supportable. Also, the other end of the reinforcing rib 41 is connected with a predetermined position of an inner corner corresponding to the outer edge of the rectangular structural body 40. However, it is apparent that the fixing position of the other end of the reinforcing rib 41 is changed. In other words, if it is satisfied that the fixing position of the other end of the reinforcing rib 41 is only placed on a different plane than the connection position of the one end of the reinforcing rib 41, the inertia of the frame 30 is increased, so that the deformation of the frame 30 can be prevented.

In the meanwhile, it can be also expected that the proposed reinforcing rib 41 has the following advantages.

First, the other end of the reinforcing rib 41 is formed at a portion where the rectangular structural body 40 is bent and the one end of the reinforcing rib 41 is formed at an outer upper edge of the rectangular structural body 40. In detail, the other end of the reinforcing rib 41 is formed fixed at a bent portion of the rectangular structural body 40 where the second vertical bar 35 meets the second rib 34. Thus, since the both ends of the reinforcing rib 41 are formed connected with the bent portions of the rectangular structural body 40, convenience in an injection molding is enhanced, so that productivity can be enhanced. Also, the deformation of the injection-molded frame can be restrained.

In addition, since the reinforcing rib 41 is formed beveled, a predetermined space for the insertion of a fixing element such as a rivet for fixing the reflection mirror to an inside of the projection television can be formed. In detail, since a predetermined space having a predetermined length (L1) can be formed between the outer side portion and the inner side portion, a rivet 60 having a sufficient length can be inserted through the length and thereby the reflection mirror can be fixed to the projection television with convenience.

Also, it is noted that although the portion where the other end of the reinforcing rib 41 is fixed to any position on the inner side surface of the rectangular structural body 40, the strength of the frame 30 can be increased.

In the meanwhile, like the first embodiment, the soft shield plate 37 is a porous material exampled as Styrofoam and prevents external vibration, impact and air flow from being directly applied to the reflection film 21.

In detail, an upper side surface of the third rib 36 is formed beveled and the soft shield plate 37 is inserted such that its corner portion is inserted between an upper surface of the third rib 36 and the second rib 34. Once the inserted soft shield plate is inserted, it does not sway.

Also, the soft shield plate 37 is prepared by cutting a large-sized Styrofoam shield plate in a proper size, for instance, in an area that is greater by a predetermined region than the area of the frame formed by the third rib 36. Afterwards, the prepared soft shield plate 37 is slightly deformed and then inserted into the third rib 36.

Figure 9:
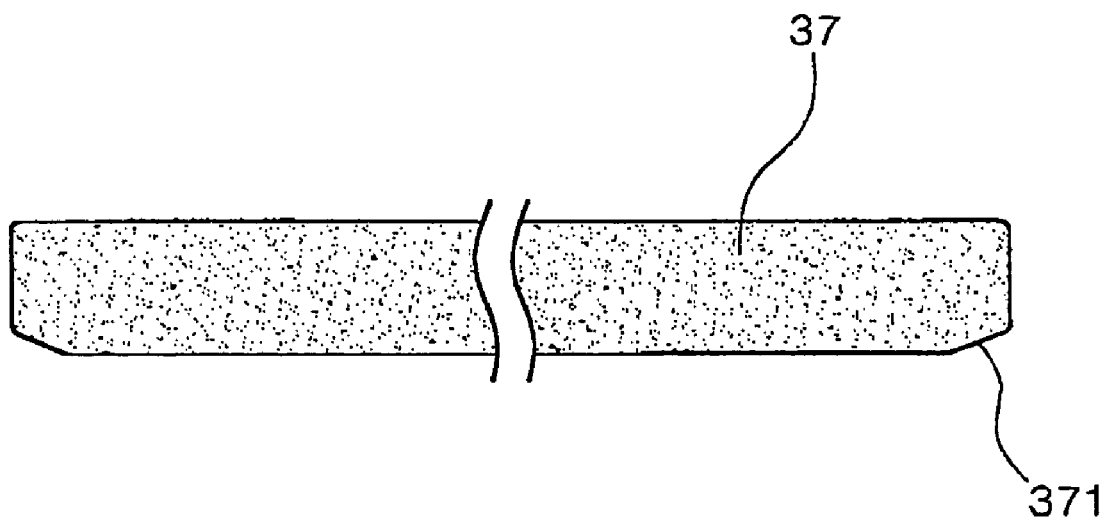
FIG. 9 is a sectional view of a soft shield plate according to a third embodiment of the present invention.

FIG. 9 is a sectional view of a soft shield plate according to a third embodiment of the present invention.

Referring to FIG. 9, the soft shield plate according to the third embodiment of the present invention has a difference in its structure and forming process than that of the second embodiment.

In detail, the soft shield plate 37 of the third embodiment has a deformed portion 371 in which the thickness of the corner portion is contracted such that the soft shield plate 37 is inserted between the second rib 34 and the third rib 36. The deformed portion 371 is pressed by an external force and deformed, or may be provided in a deformed state as fabricated.

Since the deformed portion 371 is formed on an outer circumference of the soft shield plate 37, a forced deformation can be prevented when the soft shield plate 37 is inserted into a lower side surface of the frame 30. Also, the soft shield plate 37 is inserted into a lower side surface of an opened portion of the frame 30 more stably and conveniently so that its position can be firmly supported.

In other words, in case the deformed portion 371 is not formed but the whole of the soft shield plate 37 is formed flat, the corner portion of the soft shield plate 37 should be deformed by the third rib 36 formed beveled. However, in case the deformation is not sufficient, the corner portion of the soft shield plate 37 is pushed inversely inwardly. Accordingly, the soft shield plate is deformed not to be flat as a whole but to be convex or condense at its center portion. And, if the soft shield plate 37 is deformed, air flow and vibration are not completely shielded to thereby cause a user=s inconvenience in using the projection television.

Figure 10:
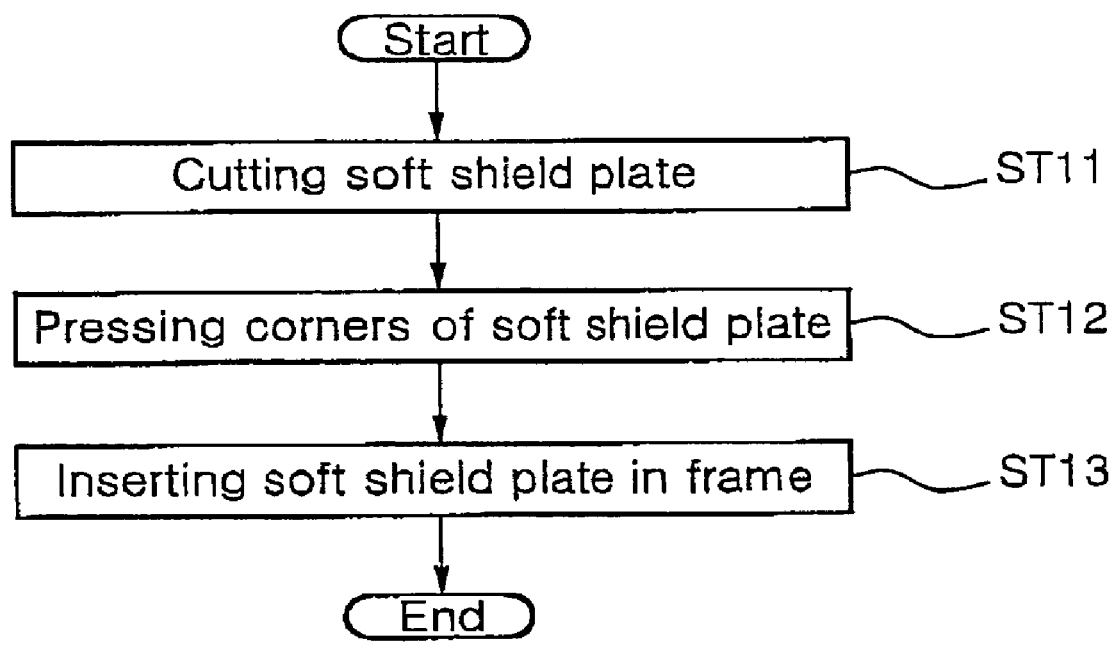
FIG. 10 is a process flowchart illustrating a method for forming a soft shield plate according to a third embodiment of the present invention.

FIG. 10 is a process flowchart illustrating a method for forming a soft shield plate according to a third embodiment of the present invention.

Since the soft shield plate 37 is of Styrofoam, a generally produced Styrofoam with a large area is first cut in a proper size (ST 11). Afterwards, four corner portions of the cut Styrofoam are pressed by an external force (ST 12). As the four corner portions of the cut Styrofoam are pressed, the four corner portions of the cut Styrofoam are contracted and deformed such that their thickness is decreased.

If the corner portions of the soft shield plate 37 are contracted and deformed, it is easily inserted into and fixed to the opened portion of the frame, thereby ending the installation of the shield plate (ST 13). At this time, since the corner portions of the soft shield plate 37 are in a deformed state, its insertion and fixing steps can be performed with convenience and ease.

As the aforementioned construction and process are applied to, the reflection mirror of the projection television needing to maintain a proper tension can be maintained at an initial state of when it is installed, for a long-term period.

Also, the construction of the reflection mirror allows the tension applied to the projection television to be more stably supported and further the picture quality projected onto a screen to be improved.

In addition, the fabrication process of the reflection mirror is further simplified, so that work efficiency is enhanced.

Further, since the thickness of the soft shield plate is decreased and air flow and vibration can be shielded, the fabrication costs are reduced.

Furthermore, since the insertion process of the soft shield plate is performed simply and can be stably inserted into a rear side surface of the frame, a worker's convenience and the product quality of the reflection mirror can be further enhanced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A reflection mirror of a projection television comprising:
    a reflection film to which a predetermined tension is applied;
    a rectangular structural body to which corner portions of the reflection film are fixed and having a rectangular section shape as a whole such that the tension of the reflection film is maintained;
    a curvature portion curvedly formed at an outer upper edge of the rectangular structural body;
    a sliding portion extending downward from the curvature portion and on which the reflection film slides freely;
    an adhesive portion formed extending from a lower side of the sliding portion to a lower edge of the rectangular structural body, for fixing the reflection film;
    at least three ribs extending inwardly from an inner side portion of the rectangular structural body; and
    a frame provided with a soft shield plate inserted between two of said at least three ribs.

2. The reflection mirror of claim 1, wherein the ribs comprise:
    first and third ribs extending inwardly from the upper and lower edges of the rectangular structural body;

a vertical bar coupled with the first and third ribs and bent at at least two portions; and a second rib formed extending from the bent portions of the vertical bar to the inside of the frame.

3. The reflection mirror of claim 2, wherein the vertical bar comprises:

a first vertical bar extending downwardly from the first rib to be coupled with the second rib; and a second vertical bar extending upwardly from the third rib and formed at a portion retreated outwardly from the first vertical bar.

4. The reflection mirror of claim 1, wherein the curvature portion comprises:

a first curvature portion formed inwardly from the outer upper edge of the rectangular structural body;

a second curvature portion extending from the first curvature portion toward an outward direction of the rectangular structural body; and a third curvature portion extending outwardly from the second curvature portion, for lubricating the reflection film.

5. The reflection mirror of claim 4, wherein the second curvature portion has a curvature radius greater than the first curvature portion.

6. The reflection mirror of claim 4, wherein the third curvature portion has a curvature radius that is greater than the first curvature portion and smaller than the second curvature portion.

7. The reflection mirror of claim 1, wherein the adhesive portion has a length ranged between two thirds of an overall height of an outer side surface of the frame and three fourths.

8. The reflection mirror of claim 1, wherein the soft shield plate has a compressed corner portion.

9. The reflection mirror of claim 1, wherein the soft shield plate is a single.

10. The reflection mirror of claim 1, wherein the rectangular structural body comprises a reinforcing rib of which both ends are connected, one end with an upper edge of an outer side surface of the rectangular structural body and the other end with a lower side of an inner side surface of the rectangular structural body.

11. The reflection mirror of claim 1, wherein at least one of said at least three ribs being placed in a direction into which the soft shield plate is inserted has an inner end portion placed outside the frame compared with another of said at least three ribs.

12. The reflection mirror of claim 1, wherein at least one of said at least three ribs being placed in a direction into which the soft shield plate is inserted has a beveled upper surface.

13. A reflection mirror of a projection television comprising:

a reflection film;

a rectangular structural body having a rectangular section shape as a whole;

a curvature portion formed at an outer upper edge of the rectangular structural body;

an adhesive portion formed at a predetermined portion of a lower side of the curvature portion and to which the reflection film is adhered;

a reinforcing rib of which one end is fixed to the outer upper edge of the rectangular structural body and the other end is fixed to an inner surface of the rectangular structural body;

a frame provided with a rib and a vertical bar formed in the rectangular structural body, for enhancing strength of the frame; and a soft shield plate formed at a lower surface of the frame.

14. The reflection mirror of claim 13, wherein the reinforcing rib has one end connected with the outer upper edge of the rectangular structural body and aslant extending.

15. The reflection mirror of claim 13, wherein the other end of the reinforcing rib is connected with a bent portion of the rectangular structural body.

16. The reflection mirror of claim 13, wherein the other end of the reinforcing rib is connected with a lower side portion of the inner surface of the rectangular structural body.

* * * * *